Patented July 4, 1933

1,916,314

UNITED STATES PATENT OFFICE

JOSEF HILGER, OF COLOGNE-MULHEIM, GERMANY, ASSIGNOR TO GENERAL ANILINE WORKS, INC., OF NEW YORK, N. Y., A CORPORATION OF DELAWARE

ISOCYANATES

No Drawing. Application filed January 2, 1932, Serial No. 584,577, and in Germany January 9, 1931.

The present invention relates to new isocyanates, more particularly it relates to isocyanates from aromatic aminoazo compounds which may be represented by the probable general formula:

$$R-N=C=O,$$

wherein the group R—N= stands for the radical of an aromatic aminoazo compound free from a free sulfonic or carboxylic acid group, but which may bear other substituents, such as a sulfonic or carboxylic acid group in the form of an ester or amide, halogen, alkyl and alkoxy.

These new isocyanates are obtainable according to my invention by causing phosgene to act on an aminoazo compound containing no free sulfonic acid or carboxylic acid group, or on a salt of an aminoazo compound of the kind referred to with an indifferent volatile acid, such as hydrochloric acid. The reaction is carried out with an increasing temperature, which in general does not finally exceed 100° C.

The reaction, which clearly proceeds in three stages presumably gives rise first to an addition product as represented by the following equation:

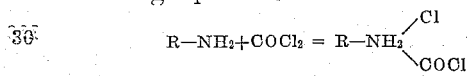

In the second stage of the reaction, which is favored by an increase in temperature, there occurs gradually, generally with dissolution, the splitting off of hydrochloric acid with the formation of urea chlorides:

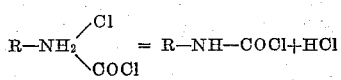

These urea chlorides are rather unstable substances, which on further heating, for example, to 80–90° C. again split off hydrogen chloride and pass into the isocyanates:

$$R-NH-COCl = R-N=C=O + HCl$$

The resulting isocyanates are generally well crystallizing yellow to reddish colored substances, displaying the characteristic reactions of the isocyanates. They are intended to find application as intermediate products in the manufacture of dyestuffs.

The invention is illustrated by the following examples, without being limited thereto:

Example 1

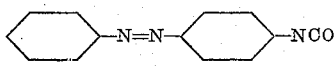

19,7 parts by weight of p-aminoazobenzene are dissolved in 250 parts by weight of dry nitrobenzene and converted into the hydrochloride by leading in dry hydrochloric acid, the hydrochloride separating as a thick, bluish-black crystal magma. Phosgene is then led in at ordinary temperature, whereupon the addition product is produced in the form of a brown sparingly soluble precipitate. While continuing to lead in phosgene slowly the temperature is raised gradually to 50–60° C., whereupon solution occurs. On evaporating the solvent from a test portion a reddish brown substance containing chlorine separates, which can be crystallized from low boiling organic solvents and melts at 110–112° C. On heating the reaction mass to 100° C. for a short time the p-phenyl-azo-phenyl isocyanate is produced, which melts at 97–98° C. It is obtained in a satisfactory yield by evaporation in vacuo. It forms reddish brown crystals and is readily soluble in benzene, chloroform, acetone and glacial acetic acid, but is almost insoluble in cold ligroin. By boiling with absolute alcohol the urethane is obtained, which is found to be identical with the urethane from aminoazobenzene and chloroformic acid ester, melting at 151° C.

Example 2

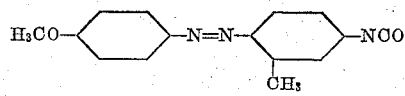

20 parts by weight of the hydrochloride of the aminoazo compound from diazotized 4-anisidine and 3-toluidine are made into a paste with 200 parts by weight of nitrobenzene and saturated with phosgene at ordinary temperature with stirring. While continuing to lead in phosgene slowly the temperature is raised quite gradually until solution occurs, which is the case at about 100° C. After distilling off the nitrobenzene in vacuo the residue can be dissolved in benzine and reprecipitated. There are obtained reddish brown needles, melting at 80° C. which display the characteristic properties of the isocyanates. The product is soluble in cold benzene, but soluble with difficulty in cold benzine.

*Example 3*

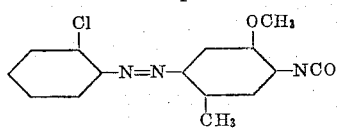

31.1 parts by weight of the hydrochloride of the aminoazo compound from diazotized 2-chloro-aniline and 3-amino-4-cresol-methylether are made into a paste with 250 ccs. of nitrobenzene and caused to react with phosgene in the manner described above. At 90° C. complete solution takes place gradually. After evaporating the solution in vacuo and crystallizing from benzine there are obtained well developed, reddish brown needles, melting at 153° C. which consist of an isocyanate. This is soluble in benzene, chloroform and hot benzine.

In an analogous manner there is produced the isocyanate derived from 1-aminonaphthalene-4-azo-o-ethoxybenzene.

*Example 4*

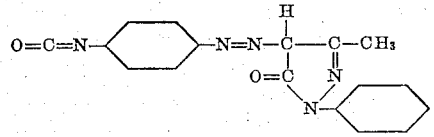

30 parts by weight of the aminoazodyestuff obtainable by reduction of the azodyestuff from diazotized p-nitro-aniline and 1-phenyl-3-methyl-5-pyrazolone are made into a suspension with 250 parts by weight of nitrobenzene, and by introducing dry gaseous hydrochloric acid the hydrochloride of the aminoazo compound is formed. Then phosgene is introduced while slowly raising the temperature. At about 70° C. complete solution has taken place. The nitrobenzene is distilled off in a vacuo and the residue is crystallized from benzine. Yellow needles of the melting point 162° C., yield 87% of theory. The compound is easily soluble in benzene, acetone and chloroform.

*Example 5*

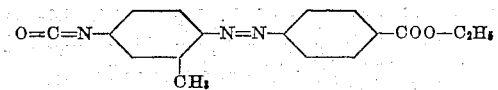

27,5 parts by weight of the azodyestuff obtained by coupling diazotized 4-aminobenzoic acid ethylester and 3-toluidine are dissolved in 250 parts by weight of nitrobenzene and transformed into the hydrochloride by introducing dry gaseous hydrochloric acid. Then phosgene is introduced, while slowly raising the temperature. At 70-80° C. complete solution has occurred. The nitrobenzene and the excess phosgene are distilled off in a vacuo and the residue is crystallized from benzine. The new isocyanate is obtained in form of yellowish red leaflets of the melting point 221° C. which are easily soluble in benzene, chloroform and glacial acetic acid.

*Example 6*

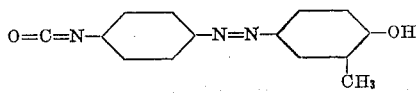

16,5 parts by weight of the aminoazodyestuff, obtainable by saponifying the acetamino group of the azodyestuff prepared by diazotizing 4-amino-acetanilide and coupling with O-cresol, are suspended in 300 parts by weight of nitrobenzene and transformed into the hydrochloride by introducing dry gaseous hydrochloric acid. Then phosgene is introduced, while slowly raising the temperature, complete solution entering at about 70° C. The nitrobenzene and excess phosgene are distilled off in a vacuo; there remains a residue which is soluble in all the usual organic solvents and which displays the characteristic reactions of the isocyanates.

I claim:

1. The compounds of the probable general formula:

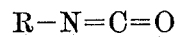

wherein the group R—N= stands for the radical of an aromatic aminoazo compound free from a free sulfonic or carboxylic acid group, being generally yellow to reddish substances and being valuable intermediate products in the manufacture of dyestuffs.

2. The compounds of the probable general formula:

wherein R and R′ stand for benzene or naphthalene nuclei which may be substituted by alkyl, alkoxy, halogen, hydroxyl and an esterified carboxylic acid group, being generally yellow to red substances, insoluble in water, soluble in organic solvents and being valuable substances in the manufacture of dyestuffs.

3. The compound of the following formula:

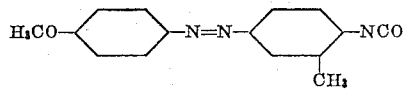

crystallizing in reddish brown needles of the melting point of 80° C. and being a valuable intermediate product in the manufacture of dyestuffs.

In testimony whereof, I affix my signature.

JOSEF HILGER.